United States Patent
Tsai et al.

(10) Patent No.: US 8,074,247 B2
(45) Date of Patent: Dec. 6, 2011

(54) VISUAL IMPROVEMENT OF VIDEO STREAM TRANSITIONS

(75) Inventors: Emeline C. Tsai, Los Altos, CA (US); Michael C. Bertram, San Jose, CA (US)

(73) Assignee: Cox Communications, Inc., Atlanta, GA (US)

( * ) Notice: Subject to any disclaimer, the term of this patent is extended or adjusted under 35 U.S.C. 154(b) by 1733 days.

(21) Appl. No.: 10/690,856

(22) Filed: Oct. 22, 2003

(65) Prior Publication Data
US 2004/0088741 A1    May 6, 2004

Related U.S. Application Data

(62) Division of application No. 09/490,029, filed on Jan. 21, 2000, now Pat. No. 6,681,397.

(51) Int. Cl.
*H04N 7/173* (2011.01)
(52) U.S. Cl. .................... 725/93; 725/91; 709/231
(58) Field of Classification Search ............ 725/87–104; 709/217–231
See application file for complete search history.

(56) References Cited

U.S. PATENT DOCUMENTS

| | | | |
|---|---|---|---|
| 5,534,944 A * | 7/1996 | Egawa et al. ................. 348/584 |
| 5,557,724 A | 9/1996 | Sampat et al. ................. 395/157 |
| 5,721,815 A * | 2/1998 | Ottesen et al. ................. 715/721 |
| 5,724,091 A * | 3/1998 | Freeman et al. .............. 725/138 |
| 5,801,753 A | 9/1998 | Eyer et al. ........................ 348/13 |
| 5,828,370 A * | 10/1998 | Moeller et al. ................. 715/720 |
| 5,838,678 A | 11/1998 | Davis et al. |
| 5,867,207 A | 2/1999 | Chaney et al. .................... 348/7 |
| 5,917,830 A | 6/1999 | Chen et al. ...................... 370/487 |
| 5,920,702 A | 7/1999 | Bleidt et al. ............. 395/200.61 |
| 6,065,050 A * | 5/2000 | DeMoney ...................... 709/219 |
| 6,154,496 A * | 11/2000 | Radha ....................... 375/240.28 |
| 6,289,165 B1 * | 9/2001 | Abecassis ....................... 386/46 |
| 6,480,667 B1 * | 11/2002 | O'Connor ....................... 386/83 |
| 6,665,050 B2 * | 12/2003 | Shiraishi .......................... 355/53 |
| 6,806,909 B1 * | 10/2004 | Radha et al. ............... 348/384.1 |
| 7,046,481 B2 * | 5/2006 | Lee ........................... 360/125.43 |
| 7,096,481 B1 * | 8/2006 | Forecast et al. ................. 725/32 |
| 7,254,175 B2 * | 8/2007 | Hurst et al. .............. 375/240.01 |

* cited by examiner

*Primary Examiner* — Annan Shang
(74) *Attorney, Agent, or Firm* — Merchant & Gould

(57) ABSTRACT

Four techniques which result in the visual improvement of transitions between video streams with a same packet identifier (PID). All four techniques are applicable in the situation where the stream transition is between two streams that utilize the same PID. Retaining the same PID reduces the delay between the time the user selects an action via the remote control to the time when the new stream is displayed on the TV.

The first technique includes two methods: a method for preconditioning video stream data for storage; and a method for transitioning between video streams which utilizes the preconditioning. The second technique involves a method for transitioning between video streams where timing information in the new stream is modified so as to be consistent with timing information in the old stream. The third technique involves a method for transitioning between video streams where packets in the old stream are replaced by picture repeat packets. The fourth technique involves a method for transitioning between video streams where packets in the old stream are replaced by null packets.

The various techniques discussed above may be combined to further improve the smoothness and quickness of the video stream transitions. For example, the first technique may be combined with either the third or fourth technique. Similarly, the second technique may be combined with either the third or fourth technique.

21 Claims, 16 Drawing Sheets

VISUAL IMPROVEMENT OF VIDEO STREAM TRANSITIONS

CROSS-REFERENCE TO RELATED APPLICATION

This application is a divisional of U.S. patent application Ser. No. 09/490,029, filed Jan. 21, 2000 now U.S. Pat. No. 6,681,397, which application is incorporated by reference herein.

BACKGROUND OF THE INVENTION

1. Field of the Invention

The present invention relates to electronics and communications. More particularly, the present invention relates to digital video systems.

2. Description of Related Art

In video on-demand (VOD) systems, digital compressed video and audio bitstreams are stored on a server and streamed out to a user's set top box or subscriber station. Over the course of the VOD session, many different streams are transmitted to a set top box to allow forward and rewind and other such features.

Typically, video must be streamed continuously to the set top box in order for it to operate properly, and video servers are designed to meet this requirement. However, servers are generally not able to switch between different streams at any precise point in the streams.

The resulting transitions seen by the user usually contain visual artifacts such as macroblocking, rolling, tearing, and shaking. Modifying the server to improve transitions is not an attractive option since it would add significant complexity and cost to the most expensive part of the VOD system.

One common method for handling stream transitions is to perform an operation analogous to a digital channel change by changing the packet identifier (PID) value that the set top box uses to identify the video that it should receive. While this technique may reduce or remove some of the visual artifacts, it does not eliminate all of them. Also, this method increases the delay incurred for the transition because the method requires that after the set top box is notified of the PID change, the set top box must flush its video buffer and wait while the video buffer is refilled. Also, the display to the user during the such a reset of the decoder buffer varies between set top vendors and models. Some set top boxes will freeze the last frame of the old stream while another may go to an entirely "black" frame.

Transition smoothing techniques generally are a tradeoff of latency (or delay), complexity, and visual quality. In addition, there are difficulties in achieving transition smoothing (or visual improvement of stream transitions) which is independent of set top box model.

SUMMARY OF THE INVENTION

The present invention solves the above described problems and overcomes the above described disadvantages relating to video stream transitions. The present invention includes four techniques which result in the visual improvement of transitions between streams with a same packet identifier (PID).

The first technique involves pre-conditioning the content before it is stored on the server, and the others involve altering the stream after it leaves the server but before it reaches the set top box. All four techniques are applicable in the situation where the stream transition is between two streams that utilize the same PID. Retaining the same PID reduces the delay between the time the user selects an action via the remote control to the time when the new stream is displayed on the TV.

The first technique includes two methods: a method for pre-conditioning video stream data for storage; and a method for transitioning between video streams which utilizes the pre-conditioning. The method for pre-conditioning provides clock references at predetermined transition points. The method for transitioning utilizes those clock references. As a result, the transition takes less time, and visual artifacts during the transition are largely removed. The first technique may be performed in a video server for storing and serving video stream data.

The second technique involves a method for transitioning between video streams where timing information in the new stream is modified so as to be consistent with timing information in the old stream. The method results in a nearly seamless visual display during the transition. The second technique may be performed in a system comprising a server, a distribution system, a subscriber station, and a retimer in the distribution system or in the server.

The third technique involves a method for transitioning between video streams where packets in the old stream are replaced by picture repeat packets. The method results in the display of a steady "freeze" frame, rather than incoherent or "black" frames which otherwise occur.

The fourth technique involves a method for transitioning between video streams where packets in the old stream are replaced by null packets. The method typically also results in the display of a steady "freeze" frame, rather than incoherent or "black" frames which otherwise occur.

The third or fourth technique may be embodied in a system including a server, a distribution network, a subscriber station, and a substituter for replacing packets in the old video stream with substitution packets. For the third technique, the substitution packets comprise picture repeat packets. For the fourth technique, the substitution packets comprise null packets.

The various techniques discussed above may be combined to further improve the smoothness and quickness of the video stream transitions. For example, the first technique may be combined with either the third or fourth technique. Similarly, the second technique may be combined with either the third or fourth technique.

DESCRIPTION OF THE SPECIFIC EMBODIMENTS

Figure 1:
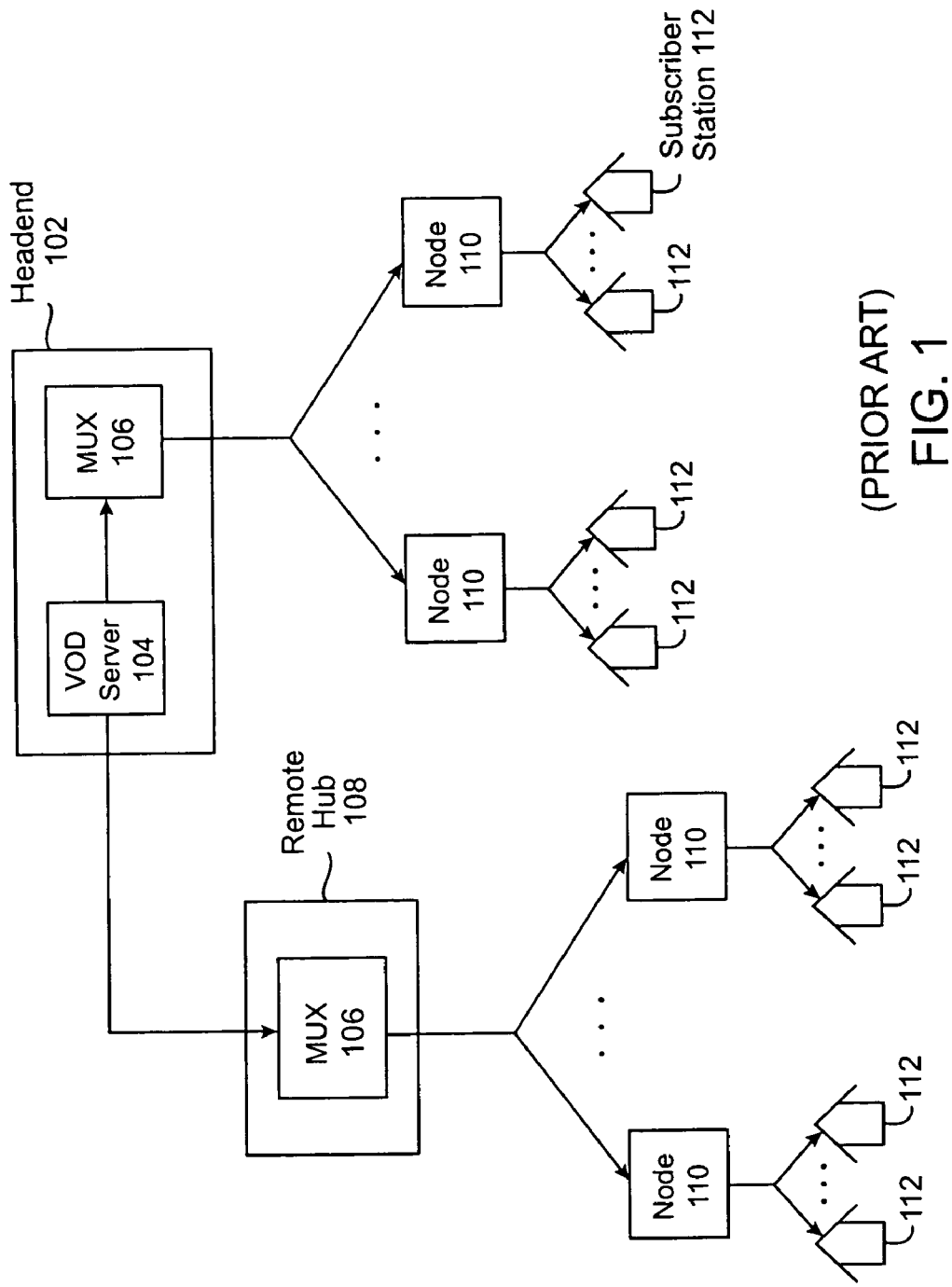
FIG. 1 is a diagram depicting one type of video distribution system.

FIG. 1 is a diagram depicting one type of video distribution system. The distribution system includes one or more headends 102, one or more remote hubs 108, a plurality of neighborhood nodes 110, and a multitude of subscriber stations 112.

One headend 102 is shown in FIG. 1. The headend 102 includes a video on-demand (VOD) server 104 and a multiplexer or remultiplexer (MUX) 106. The VOD server 104 includes a storage array to store digital video content and computer hardware/software to selectively serve the digital video content. The VOD server 104 may transmit digital video streams to a MUX 106. The VOD server 104 may comprise, for example, a DIVA Video Server or a similar device, and the link to the MUX 106 may comprise, for example, Gigabit asynchronous serial interface (ASI) optical links.

The MUX 106 may be located within the headend 102, or the MUX 106 may be located within a remote hub 108. The MUX 106 may comprise, for example, a DIVA Digital Link (DDL) product or a similar device. The DDL product, for example, is based on the CompactPCI bus system and provides MPEG multiplexing, QAM modulation/upconversion, and access control for on-demand TV services. The MUX 106 outputs radiofrequency (RF) signals carrying the digital video information to the nodes 110 and subsequently to the subscriber stations 112 via the distribution system. Although a cable distribution system is illustrated in FIG. 1, the present invention may be used within other distribution systems as well.

Figure 2A:
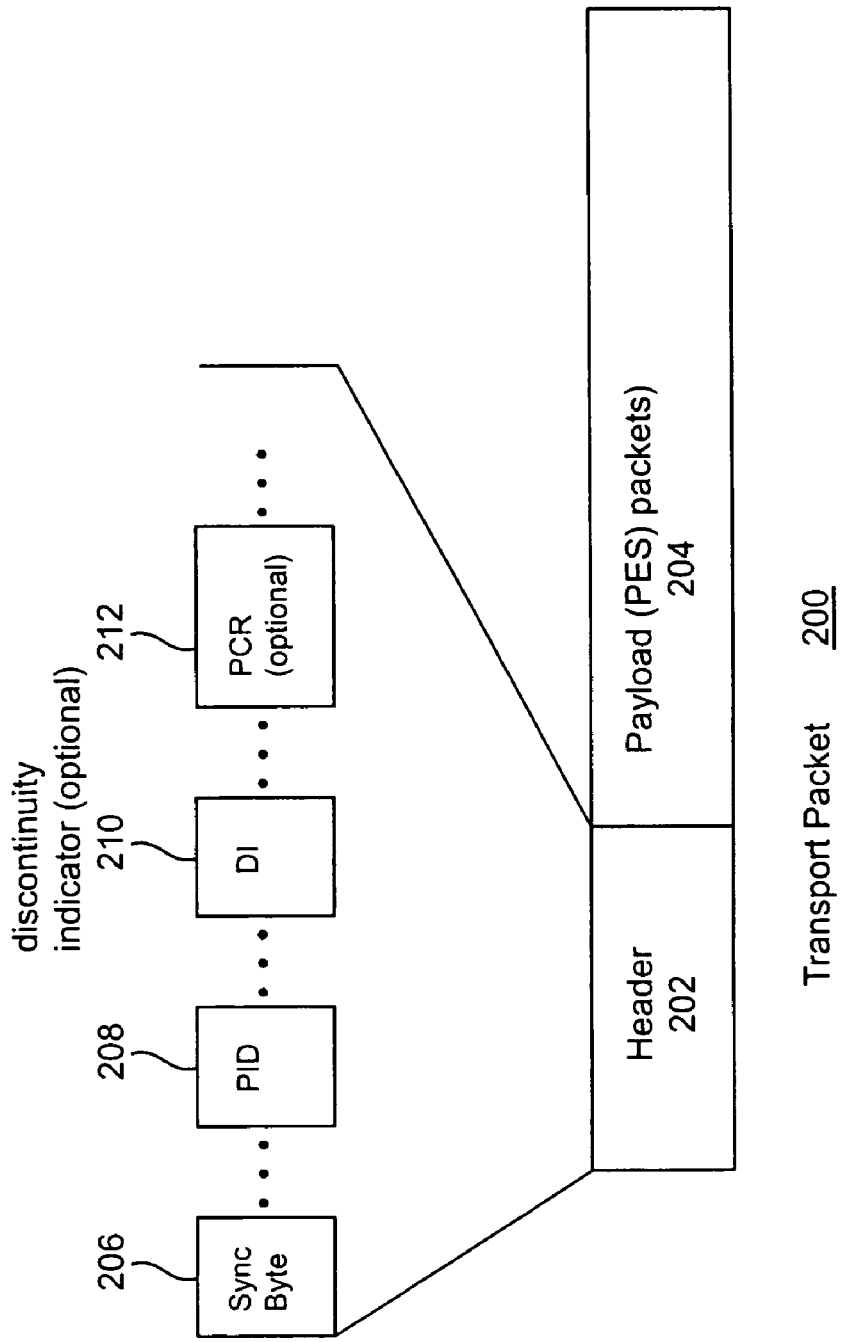
FIG. 2A is a schematic diagram of a transport packet for transporting digital video streams.

FIG. 2A is a schematic diagram of a transport packet for transporting digital video streams. The transport packet 200 includes a header 202 and a payload 204. The header 202 may include a sync byte 206, a packet identifier (PID) 208, a discontinuity indicator (DI) 210, and a program clock reference (PCR) 212, among other fields. Some of the fields, including the DI 210 and PCR 212, may be optional. The payload 204 may include program elementary stream (PES) packets. The structure of a transport packet is described in further detail in descriptions of the MPEG-2 Systems standard (part 1 of ISO/IEC 13818). Although a MPEG-2 transport packet is illustrated in FIG. 2A, the present invention may also be used with transport packets of other digital video systems.

Figure 2B:
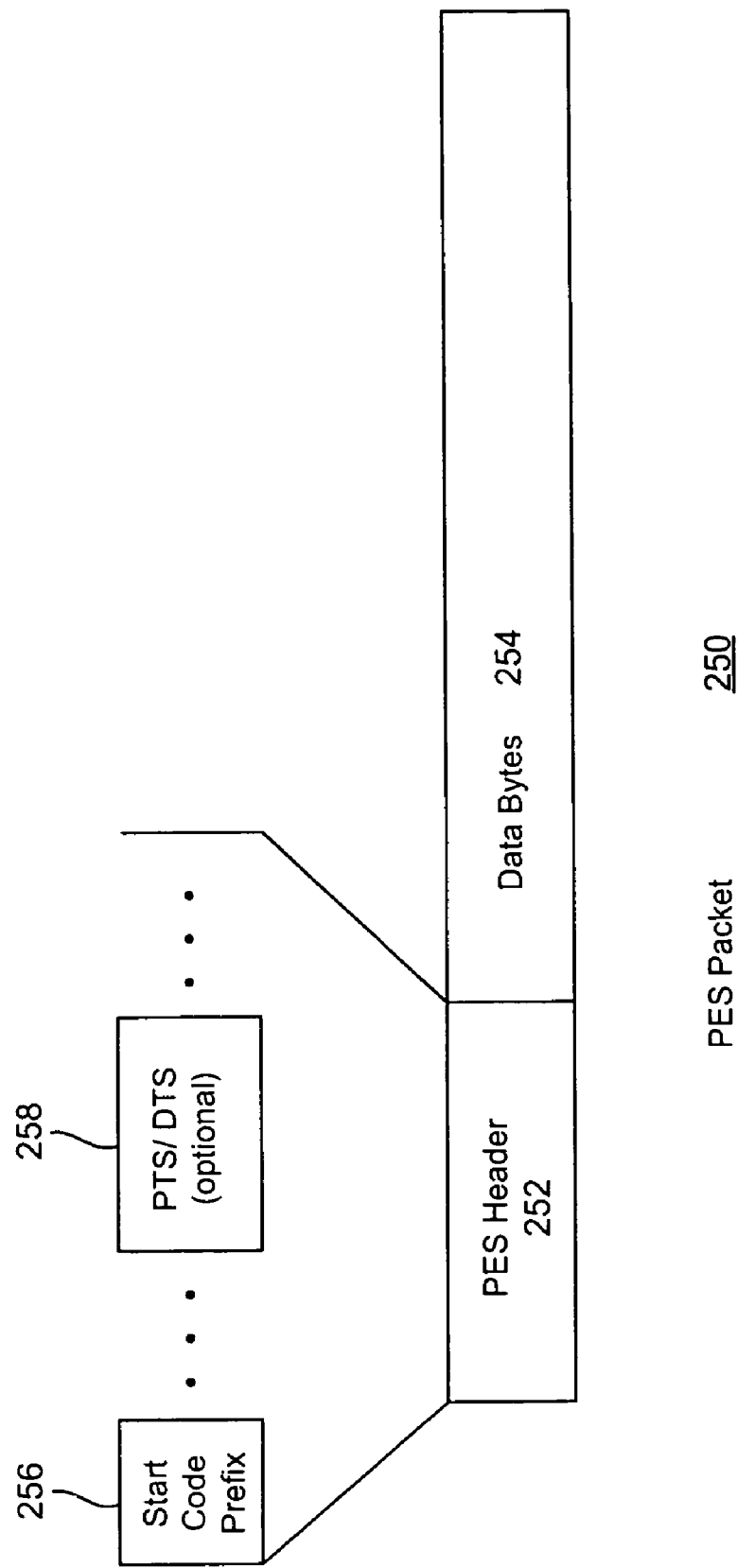
FIG. 2B is a schematic diagram of a program elementary stream (PES) packet for containing video stream data.

FIG. 2B is a schematic diagram of a program elementary stream packet for containing video stream data. The PES packet 250 includes a PES header 252 and data bytes 254. The PES header 252 may include a start code prefix 256 and presentation/decode time stamps (PTS/DTS) 258, among other fields. Some of the fields, including the PTS/DTS, may be optional. The structure of a PES packet is described in further detail in descriptions of the MPEG-2 Systems standard (part 1 of ISO/IEC 13818). Although a MPEG-2 PES packet is illustrated in FIG. 2B, the present invention may also be used with elementary stream packets of other digital video systems.

Figure 3A:
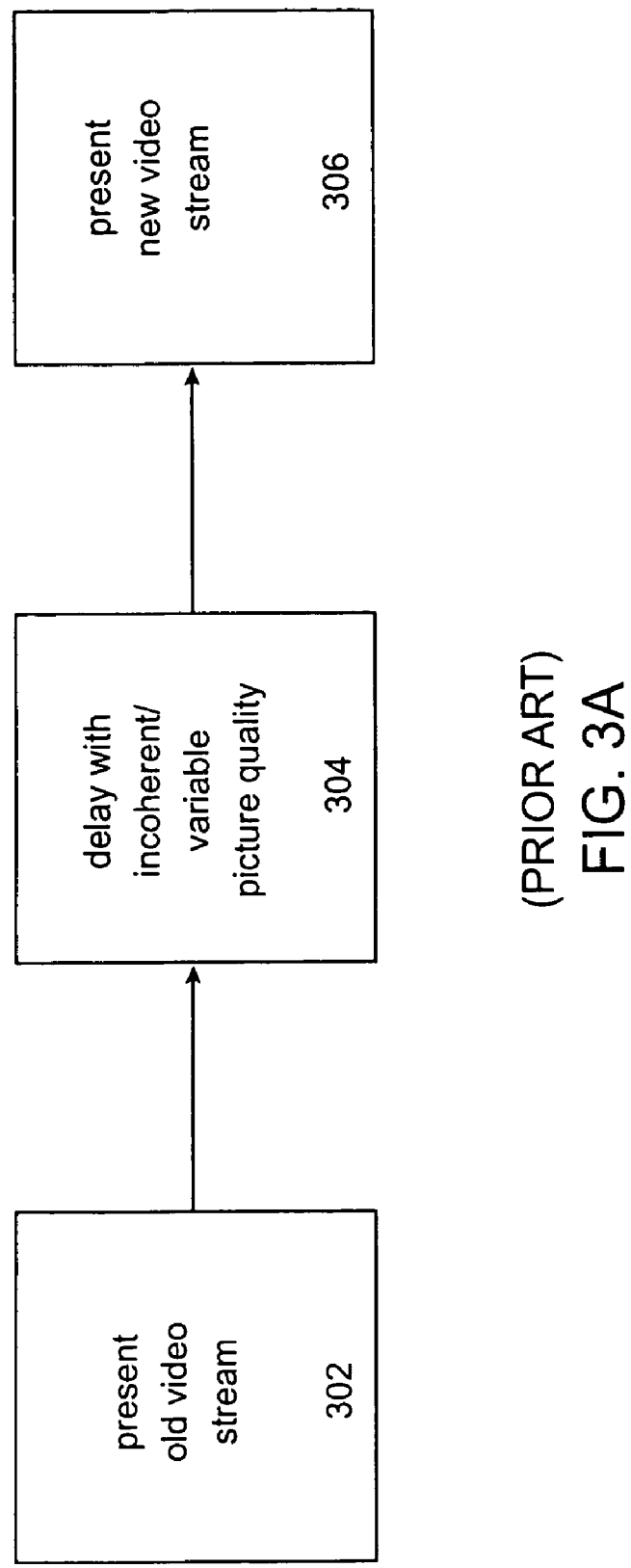
FIG. 3A is a flow chart which indicates the delay and incoherent and variable picture quality of conventional transitions between streams with a same PID.

FIG. 3A is a flow chart which indicates the delay and incoherent and variable picture quality of conventional transitions between streams with a same PID. For example, an "old" stream may be a normal speed presentation of a movie, and a "new" stream may be a fast-forwarding stream of the same movie. As shown in FIG. 3A, between presenting 302 the old video stream and presenting 306 the new video stream, there is a delay 304 in presentation during which an incoherent and variable picture quality is displayed. The length of the delay 304 and the nature of the incoherence and variable picture quality depends upon the particular system, including which model of set-top box is used for the subscriber station 112. The delay may be up to several seconds or longer. The incoherence may include, for example, visual artifacts such as macroblocking, rolling, tearing, and shaking. The causes of these problems are described further below in relation to FIGS. 4-6.

Figure 3B:
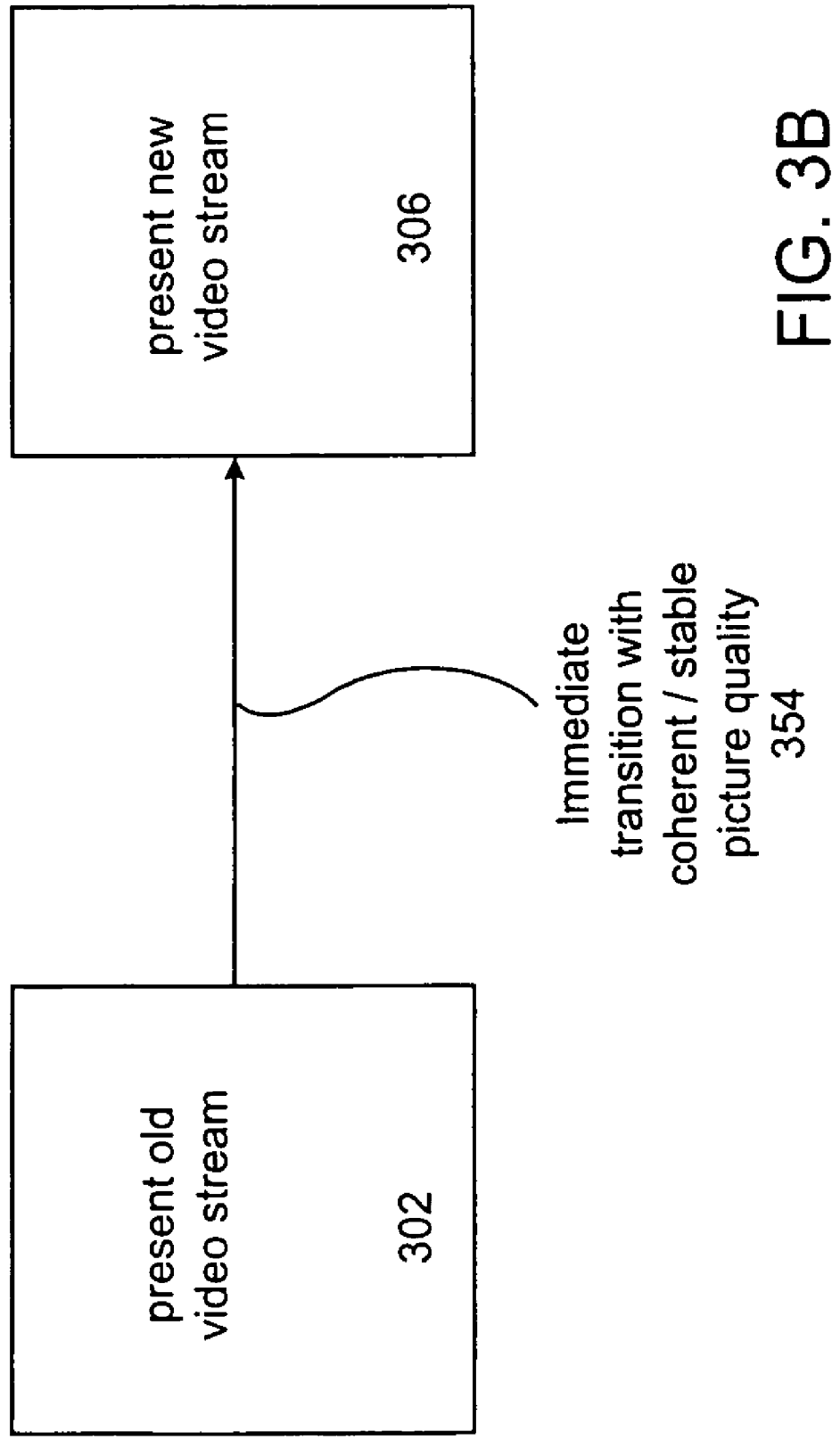
FIG. 3B is a flow chart which indicates the immediateness and coherent and stable picture quality of transitions between streams with a same PID in accordance with the present invention.

FIG. 3B is a flow chart which indicates the immediateness and coherent and stable picture quality of transitions between streams with a same PID in accordance with the present invention. As shown in FIG. 3B, between presenting 302 the old video stream and presenting 306 the new video stream, there is no significant delay. Moreover, during the very short transition 354, a coherent and stable picture quality is presented. The present invention enables this even for a system with different models of set-top boxes as subscriber stations 112. The ways by which the present invention achieves this result is described in further detail below in relation to FIGS. 7-14.

Figure 4:
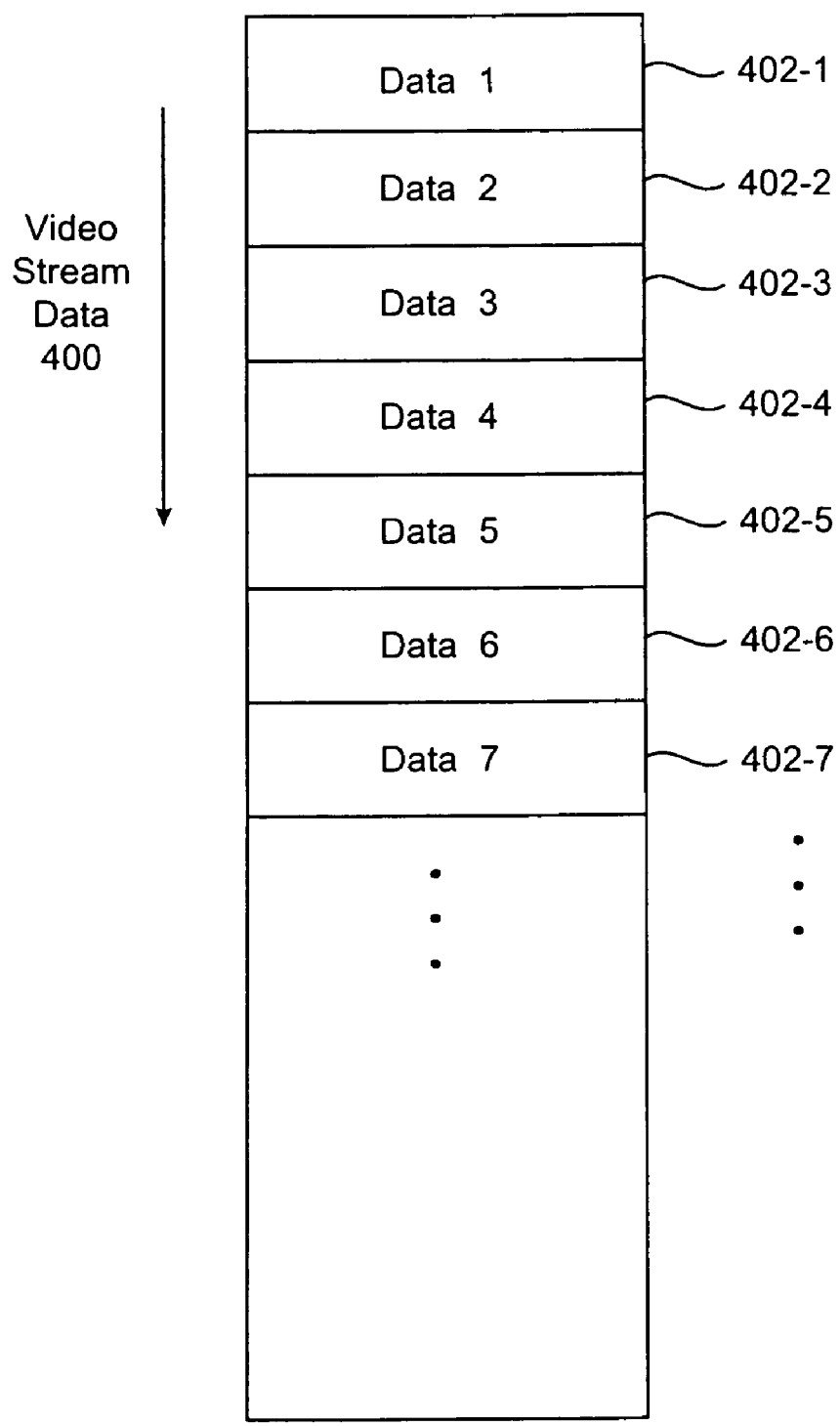
FIG. 4 is a schematic diagram of a digital video stream.

FIG. 4 is a schematic diagram of a digital video stream. The video stream 400 may be divided schematically into a linear series of data sections 402. The stream 400 in FIG. 4 is depicted for purposes of illustration with respect to storage of the stream in FIG. 5.

Figure 5:
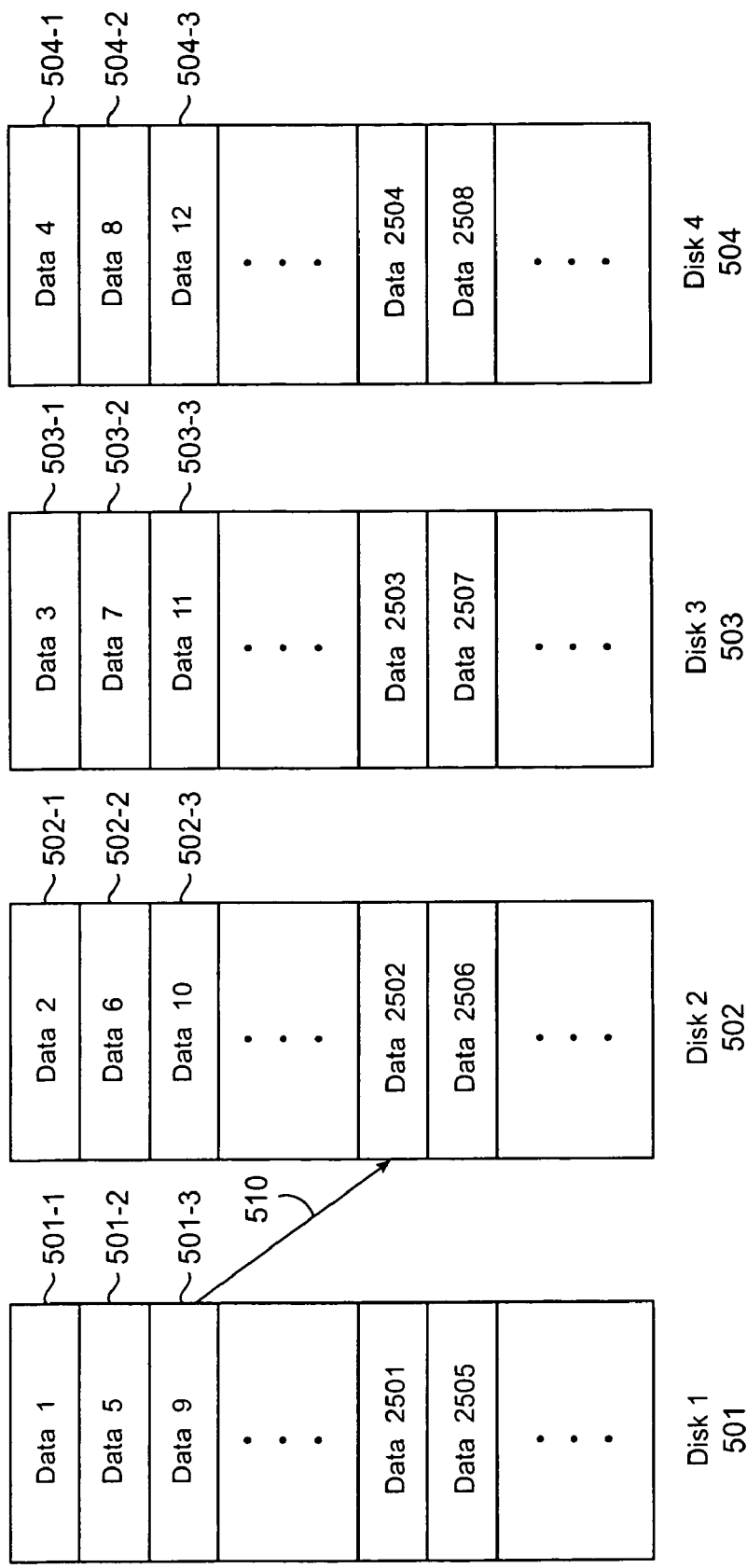
FIG. 5 is a schematic diagram depicting one conventional scheme for storing video stream data in a storage array.

FIG. 5 is a schematic diagram depicting one conventional scheme for storing video stream data in a storage array. The illustrated storage array includes, for purposes of example, storage disks 1-4 501-504. Of course, the scheme may be applied to storage arrays using any number of storage disks.

The data stream 400 is stored in the disk array in a striped scheme. For example, a first data section (data 1) is stored in a first stripe section 501-1 on disk 1. A second data section (data 2) is stored in a first stripe section 502-1 on disk 2. A third data section (data 3) is stored in a first stripe section 503-1 on disk 3. A fourth data section (data 4) is stored in a first stripe section 504-1 on disk 4. Thus, data 1-4 are stored in a first stripe across the disks 1-4. Similarly, data 5-8 are stored in a second stripe (501-2, 502-2, 503-2, and 504-2) across the disks 1-4. Further, data 9-12 are stored in a third stripe (501-3, 502-3, 503-3, and 504-3) across the disks 1-4, data 2501 through data 2508 and respectively stored in a 626$^{th}$ and 627$_{th}$ stripe across disks 1-4 (501-504), and so on.

Also illustrated in FIG. 5 is an example of a transition. The example transition 510 is from data 9 stored on disk 1 to data 2502 stored on disk 2.

Figure 6:
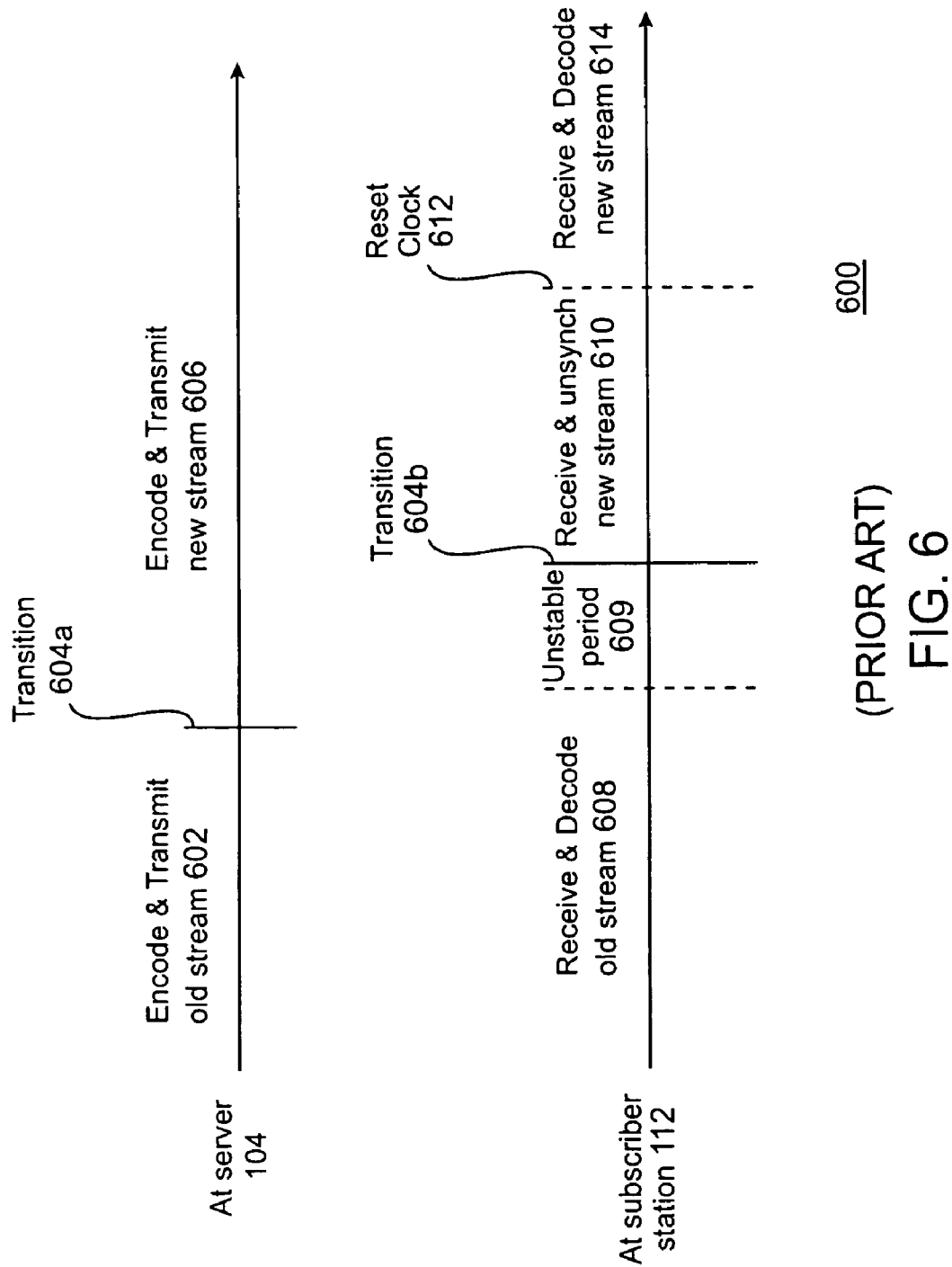
FIG. 6 is a timeline diagram illustrating a conventional method for making a transition between video streams with a same packet identifier (PID).

FIG. 6 is a timeline diagram illustrating a conventional method 600 for making a transition between video streams with a same packet identifier (PID). FIG. 6 illustrates problems with such conventional transitions.

The first (top) timeline in the diagram represents events at the server (encoder) 104. Prior to the transition 604*a*, timing information is properly synchronized between the server (encoder) 104 and the subscriber station (decoder) 112. Properly synchronized timing information is necessary for the subscriber station 112 to decode a video stream. Hence, in a first period 602 which is prior to the transition, the server 104 is able to encode and transmit an old video data stream. The first period 602 ends when the transition 604*a* from the old video stream to a transition point in a new video stream occurs. An example of such a transition is illustrated by the transition 510 shown in FIG. 5. In a second period 606, data from the new video stream is encoded and transmitted.

The second (bottom) timeline of the diagram represents events at the subscriber station (set-top) 112. Again, prior to the transition 604*b*, timing information is synchronized between server 104 and subscriber station 112. In a first period 608 which is prior to the transition 604*b*, the subscriber station 112 is able to receive and decode the old video data stream.

At the end of the first period 608, in many instances there is a second period 609 during which the video being displayed by the subscriber station 112 may be unstable and contain various problems and artifacts. The second period 609 may be caused, for example, by an abrupt transition 604*a* where insufficient information was transmitted by the server 104 for the subscriber station 112 to properly decode and present the last few pictures of the old video stream. The second period 609 ends with the transition 604*b*, before which the old video stream is received and after which the new video stream is received.

After the transition 604*b*, a third period 610 typically occurs. During the third period 610, data from the new video stream is being received, but the timing information is not yet properly synchronized between the new stream and the subscriber station 112. In particular, the program clock reference (PCR) values of the old and new video streams are generally very different. Hence, after the transition 604*b*, the clock at the subscriber station 112 is no longer in synchronization with the timing information in the new stream being received from the server 104. As a result, the subscriber station 112 is not able to decode and present the new stream during the third period 610. Hence, the third period 610 comprises a delay period during which the video being displayed by the subscriber station 112 may be unstable and contain various problems and artifacts. The third period 610 may last a few to many tens of frames or longer (up to a few seconds or more) depending upon the particular system and set-top box.

The third period 610 ends when the subscriber station 112 finally resets 612 its clock so as to be properly synchronized with the timing information in the new stream. Exactly when the subscriber station 112 resets 612 its clock depends upon the particular system and model. In one system and model, the reset 612 occurs only after several PCR values are received from the new stream. This may take a noticeably long time.

Once the clock is reset 612, the subscriber station 112 enters a fourth period 614 where it is able to receive and decode the new stream.

Note in FIG. 6, that the transition 604*b* in the bottom timeline is shifted to the right (i.e. slightly later in time) than the transition 604*a* in the top timeline. This is because the slight time lag between when the transition 604*a* occurs at the server 104 and when the transition 604*b* occurs at the subscriber station 112, where the transition is defined as being the change between old and new streams. A similar note is applicable to the other timeline diagrams described herein.

Figure 7:
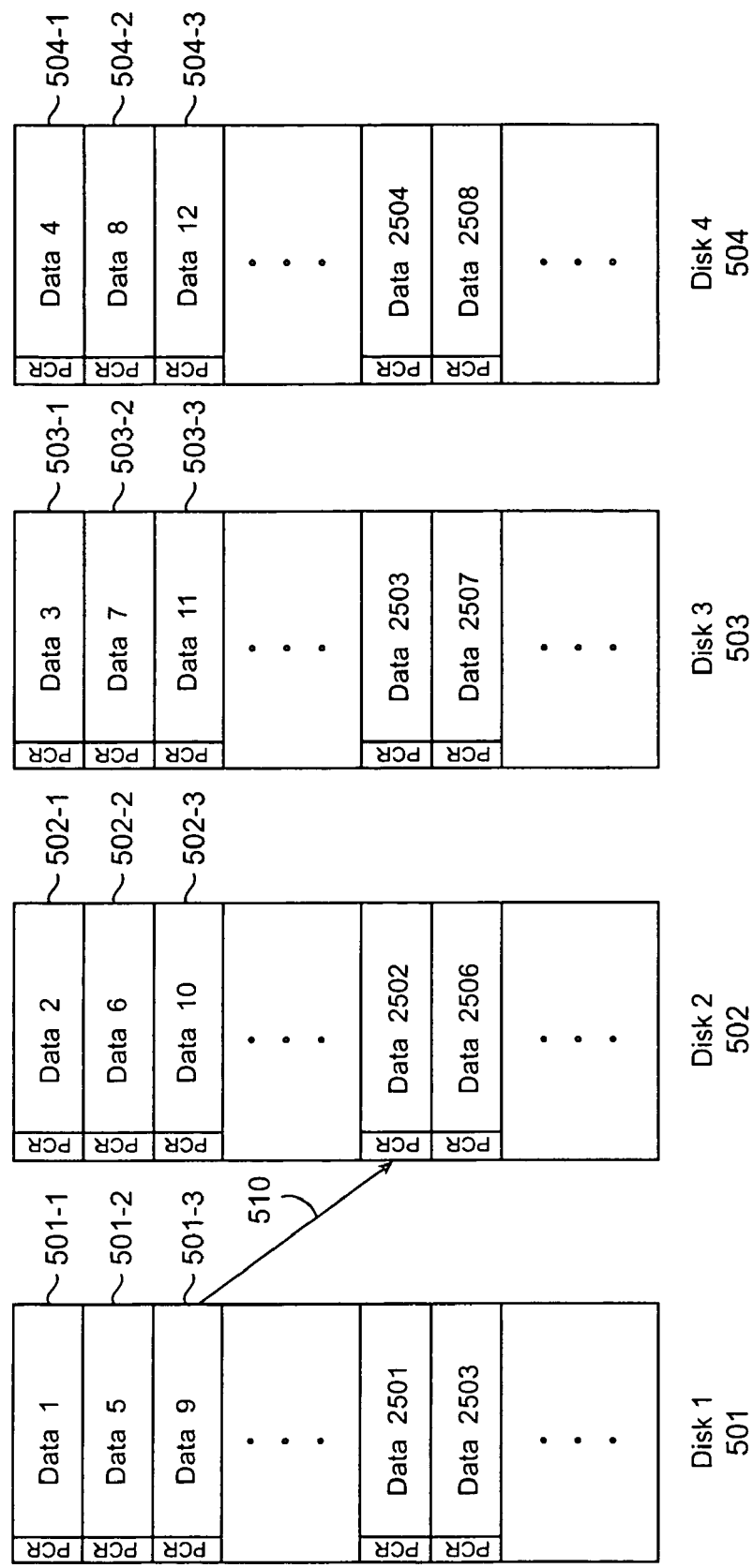
FIG. 7 is a schematic diagram depicting a scheme for storing video stream data in a storage array in accordance with a first technique of the present invention.

FIG. 7 is a schematic diagram depicting a scheme for storing video stream data in a storage array in accordance with a first technique of the present invention. The scheme of FIG. 7 has many similarities to the conventional scheme of FIG. 5.

Like the storage array in FIG. 5, the storage array in FIG. 7 includes, for purposes of example, storage disks 1-4 501-504. Of course, the present invention contemplates application to storage arrays using any number of storage disks.

Also like FIG. 5, FIG. 7 shows the data stream 400 being stored in the disk array in a striped scheme. That is, FIG. 7 is the same as FIG. 5, except for the differences noted below. For example, a first data byte section (data 1) is stored in a first stripe section 501-1 on disk 1. A second data byte section (data 2) is stored in a first stripe section 502-1 on disk 2. A third data byte section (data 3) is stored in a first stripe section 503-1 on disk 3. A fourth data byte section (data 4) is stored in a first stripe section 504-1 on disk 4. Thus, data 1-4 are stored in a first stripe across the disks 1-4. Similarly, data 5-8 are stored in a second stripe across the disks 1-4. Data 9-12 are stored in a third stripe across the disks 1-4 data 2501 through data 2508 are respectively stored in a 626$^{th}$ and 627$^{th}$ stripe across disks 1-4, and so on.

Also like FIG. 5, FIG. 7 shows an example of a transition. The example transition 510 is from data 9 stored on disk 1 to data 2502 stored on disk 2.

However, the storage scheme in FIG. 7 differs from the storage scheme in FIG. 5 in the arrangement of data within each stripe section. In particular, a first transport packet within each stripe section includes a program clock reference (PCR) value. Such a PCR value is normally optional under MPEG-2, but would always be included at the beginning of each stripe section in accordance with the present invention. In a preferred embodiment, the first transport packet would comprise a PCR value 212 and an empty payload 204. Such a packet (with PCR 212 but no payload 204) may be called a PCR packet.

When a transition between streams occurs, the first transport packet in the new stream includes a new PCR value. This characteristic may be used advantageously to avoid the period 610 in FIG. 6 where data from the new stream is undecodable by the subscriber station 112.

Figure 8:
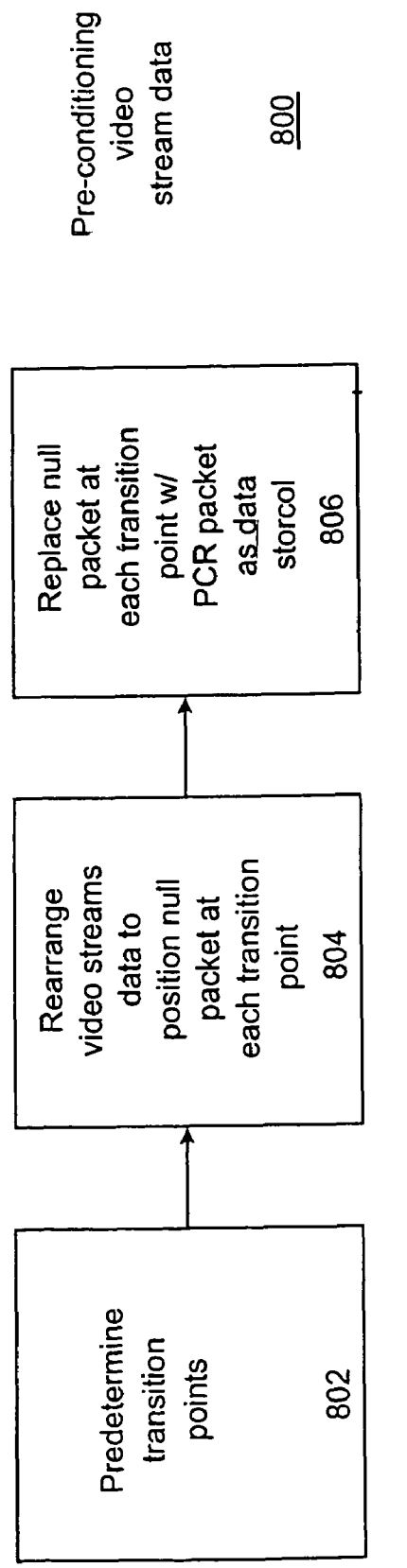
FIG. 8 is a flow chart of a method of pre-conditioning video stream data in accordance with the first technique of the present invention.

FIG. 8 is a flow chart of a method 800 of pre-conditioning video stream data in accordance with the first technique of the present invention. The pre-conditioning is applied as the video stream data is stored in a storage array of a video server 104.

In a first step 802, transition points where stream transitions may occur are predetermined. In the example of the storage scheme shown in FIG. 7, the transition points may comprise the beginning (the first transport packet) of each stripe section.

In a second step 804, the video stream data within each stripe section is rearranged to position a null packet at each transition point. Such rearrangement is possible because each stripe section will contain at least one and typically many null packets. Such null packets are generally present for purposes of stuffing to support the continuous streaming requirement. In MPEG-2, a null packet comprises a transport packet 200 with a designated PID 208 which identifies the packet as a null packet. The payload 204 of a null packet is generally ignored or discarded by a decoder.

In a third step 806, the null packet at each transition point (for example, at the beginning of each stripe section) is replaced with a PCR packet as the video stream data 400 is stored in the storage array. As described above in relation to FIG. 7, the PCR packet comprises a PCR value 212 and an empty payload 204.

Figure 9:
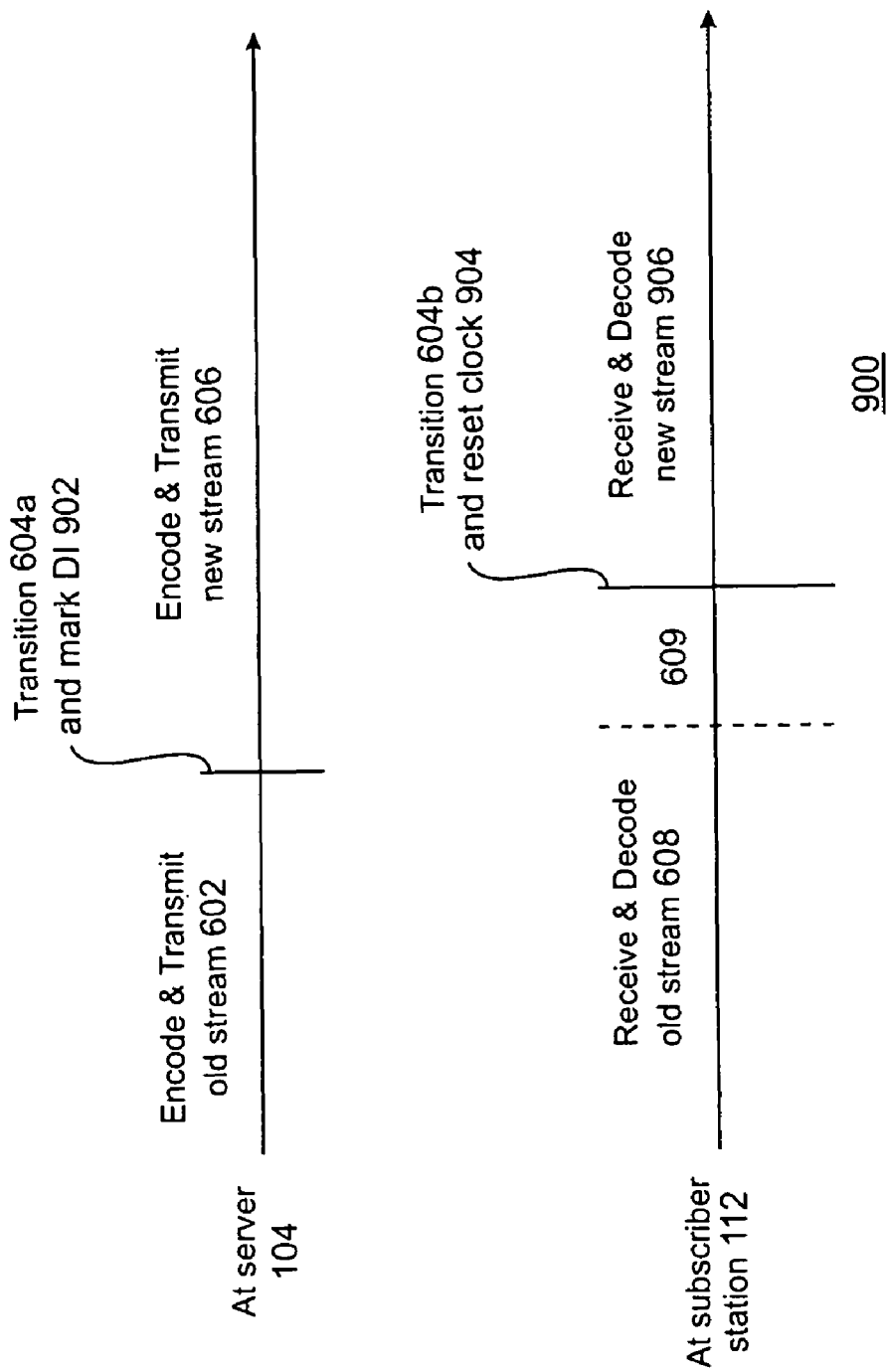
FIG. 9 is a flow chart of a method for transitioning between digital video streams with a same PID in accordance with the first technique of the present invention.

FIG. 9 is a timeline diagram illustrating a method 900 for transitioning between digital video streams with a same PID in accordance with the first technique of the present invention. The method 900 of FIG. 9 may be used in conjunction with the method 800 of FIG. 8 to speed-up and remove problems and artifacts from transitions between video streams with the same PID. By using the methods of FIGS. 8 and 9, such transitions may be made while avoiding the unsynchronized delay 610 after the transition 604b in FIG. 6.

The first (top) timeline in the diagram represents events at the server (encoder) 104. In a first period 602 which is prior to the transition, the server 104 encodes and transmits an old video data stream. The first period 602 ends when the transition 604a from the old video stream to a transition point in a new video stream occurs. An example of such a transition 604a is illustrated by the transition 510 shown in FIG. 7. As shown in FIG. 7, a PCR packet is located at the transition point in the beginning of the new stream. Moreover, as indicated in FIG. 9, the server 104 marks a discontinuity indicator (DI) 902 in that PCR packet before serving it. Subsequently, in a second period 606, data from the new video stream is encoded and transmitted.

The second (bottom) timeline of the diagram represents events at the subscriber station (set-top) 112. In a first period 608, the subscriber station 112 is able to receive and decode the old video data stream. At the end of the first period 608, there may be a second period 609 of instability as described above in relation to FIG. 6. Like in FIG. 6, the second period 609 ends with the transition 604b. However, as shown in FIG. 9, in conjunction with the transition 604b, the subscriber station 112 immediately resets 904 its clock upon receipt of the PCR packet with discontinuity indicator marked therein. This advantageously avoids the delay of the third period 610 in FIG. 6 where data from the new stream is undecodable by the subscriber station 112. Instead, after the transition 604b, the subscriber station 112 goes directly to a third period 906 where it is able to receive and decode the new stream.

Figure 10:
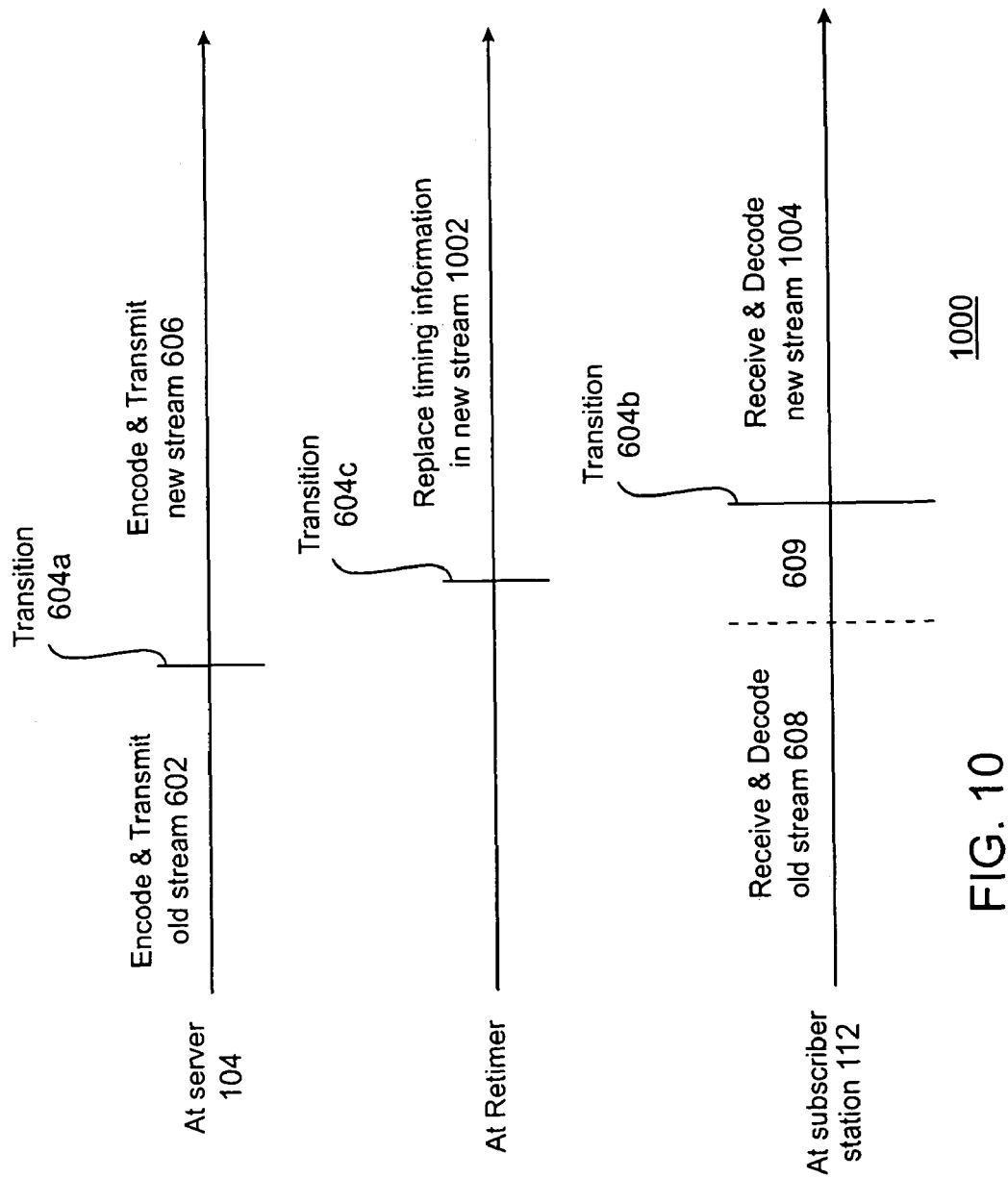
FIG. 10 is a timeline diagram illustrating a method for transitioning between digital video streams with a same PID in accordance with a second technique of the present invention.

FIG. 10 is a flow chart of a method for transitioning between digital video streams with a same PID in accordance with a second technique of the present invention. By using the method 1000 of FIG. 10, such transitions may be made while avoiding the unsynchronized delay 610 after the transition 604b in FIG. 6. Thus, the second technique may be used to achieve results similar to those achieved by the first technique described above.

The first (top) timeline in the diagram represents events at the server (encoder) 104. In a first period 602 which is prior to the transition, the server 104 encodes and transmits an old video data stream. The first period 602 ends when the transition 604a from the old video stream to a transition point in a new video stream occurs. Subsequently, in a second period 606, data from the new video stream is encoded and transmitted.

The second (middle) timeline of the diagram represents events at a retimer device. In a preferred embodiment, the retimer is located at a MUX 106. As shown in FIG. 1, the MUX 106 may be located, for example, at a headend 102 or a remote hub 106 within a distribution system. Alternatively, the retimer may be part of a video server 104. After the transition 604c, the retimer replaces 1002 the timing information in the new stream with recalculated timing information so as to be compatible with the timing information in the old stream.

The recalculation of the timing information is done based on the last received clock reference (PCR in MPEG-2) from the old stream. For example, a "clock counter" may be maintained by the retimer. While the old stream is being transmitted, the retimer may adjust the clock counter to be synchronized with the clock references in the old stream. After the transition 604c, when the retimer receives a new stream packet that includes a clock reference, the retimer may calculate a "clock shift" equal to the difference between the clock counter and the new stream clock reference. Subsequently, the retimer may add the clock shift to future clock references in the new stream so as to make these future clock references consistent with the timing of the old stream. Similarly, the retimer may also calculate a "stamp shift" based on the clock shift. For example, the stamp shift may be calculated by dividing the clock shift by 300 for MPEG-2 systems. The retimer may add the stamp shift to future timestamps (PTS/DTS in MPEG-2) in the new stream so as to make these future time stamps consistent with the timing of the old stream.

Similarly, for a subsequent stream (not shown) after the new stream, the clock references and time stamps in the subsequent stream would be made consistent with the timing of the new stream. Thus, the recalculation would be performed again for subsequent transitions.

The third (bottom) timeline of the diagram represents events at the subscriber station (set-top) 112. In a first period 608, the subscriber station 112 is able to receive and decode the old video data stream. At the end of the first period 608, there may be a second period 609 of instability as described above in relation to FIG. 6. Like in FIG. 6, the second period 609 ends with the transition 604b. As indicated in FIG. 10, the subscriber station 112 goes directly to a period 1004 where it is able to receive and decode the new stream. This is possible because the timing information in the new stream has been replaced so as to be consistent with the timing information in the old stream. Hence, proper synchronization is maintained through the transition 604b. This advantageously avoids the period 610 in FIG. 6 where data from the new stream is undecodable by the subscriber station 112.

Note in FIG. 10, that the transition 604c in the middle timeline is shifted to the right (i.e. slightly later in time) than the transition 604a in the top timeline. And the transition 604b in the bottom timeline is shifted to the right than the transition 604c in the middle timeline. This is because the slight time lag between the transitions 604a, 604c, and 604b, where the transition is defined as being the change between old and new streams.

Figure 11:
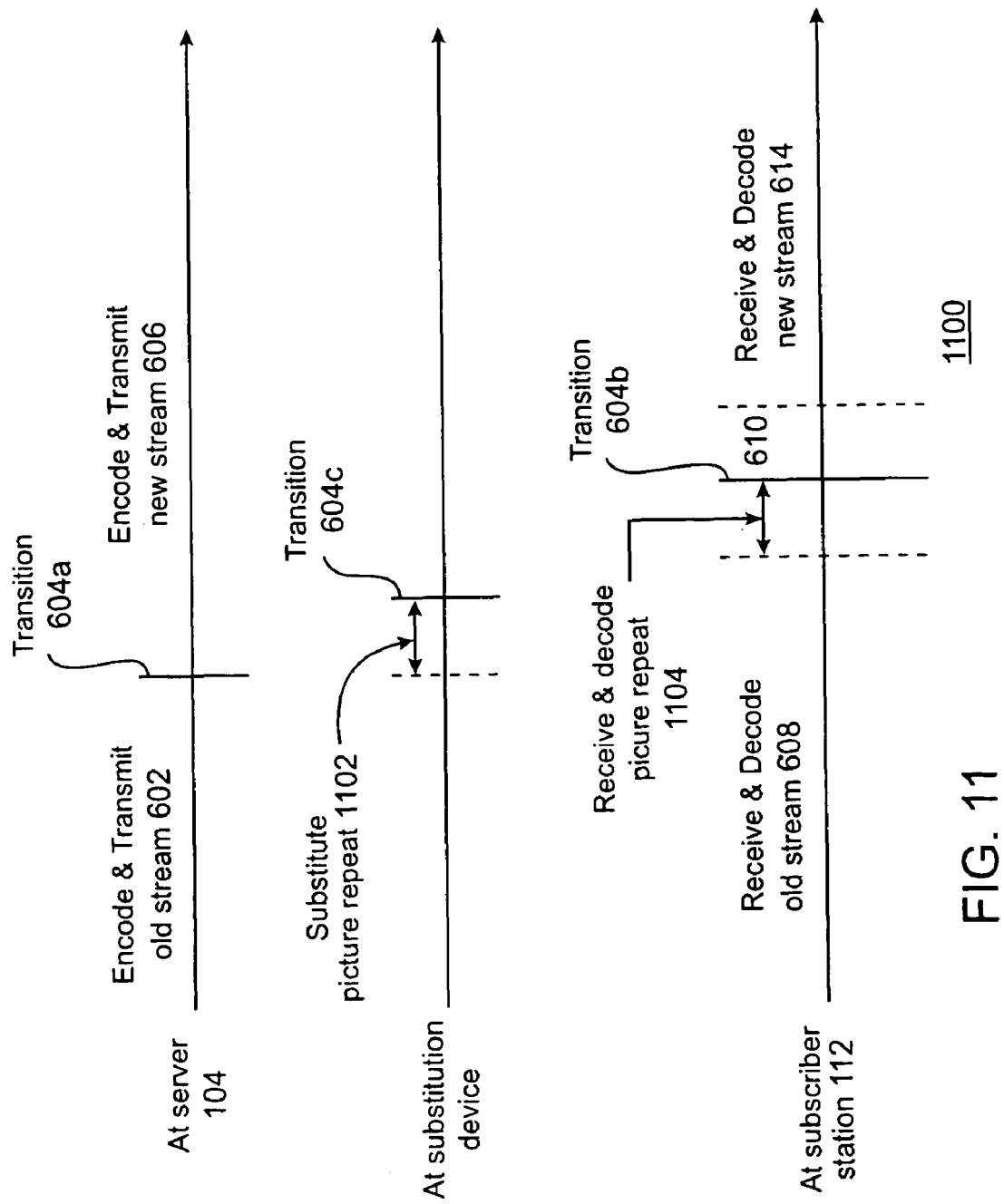
FIG. 11 is a timeline diagram illustrating a method for transitioning between digital video streams with a same PID in accordance with a third technique of the present invention.

FIG. 11 is a timeline diagram illustrating a method for transitioning between digital video streams with a same PID in accordance with a third technique of the present invention. By using the method 1100 of FIG. 11, such transitions may be made while avoiding the unstable period 609 prior to the transition 604b in FIG. 6.

The first (top) timeline in the diagram represents events at the server (encoder) 104. In a first period 602 which is prior to the transition, the server 104 encodes and transmits an old video data stream. The first period 602 ends when the transition 604a from the old video stream to a transition point in a new video stream occurs. Subsequently, in a second period 606, data from the new video stream is encoded and transmitted.

The second (middle) timeline of the diagram represents events at a substitution device. In a preferred embodiment, the substitution device is located at a MUX 106. As shown in FIG. 1, the MUX 106 may be located, for example, at a headend 102 or a remote hub 106 within a distribution system. Alternatively, the substitution device may be part of a video server 104. For a time period 1102 before the transition 604c, the substitution device replaces packets in the old stream with "picture repeat" packets. The "picture repeat" packets comprise zero motion vectors and results in a still frame image without video artifacts being shown at the subscriber station 112. The picture repeat packets may be substituted or repeatedly inserted until the start of the new stream at the transition 604c.

The third (bottom) timeline of the diagram represents events at the subscriber station (set-top) 112. In a first period 608, the subscriber station 112 is able to receive and decode the old video data stream. As the first period ends 608, a second period 1104 occurs during which "picture repeat" packets are received. During this second period 1104, the subscriber station 112 essentially repeats the last picture (in display order) of the first period 608. As discussed further below in relation to FIG. 12, this last picture is preferably a "reference picture."

After the transition 604b, a third period 610 and a fourth period 614 may follow, as described above in relation to FIG. 6. During the third period 610, data from the new video stream is being received, but the timing information is not yet properly synchronized between the new stream and the subscriber station 112. The third period 610 ends when the subscriber station 112 finally resets 612 its clock so as to be properly synchronized with the timing information in the new stream. Once the clock is reset 612, the subscriber station 112 enters the fourth period 614 where it is able to receive and decode the new stream.

Figure 12:
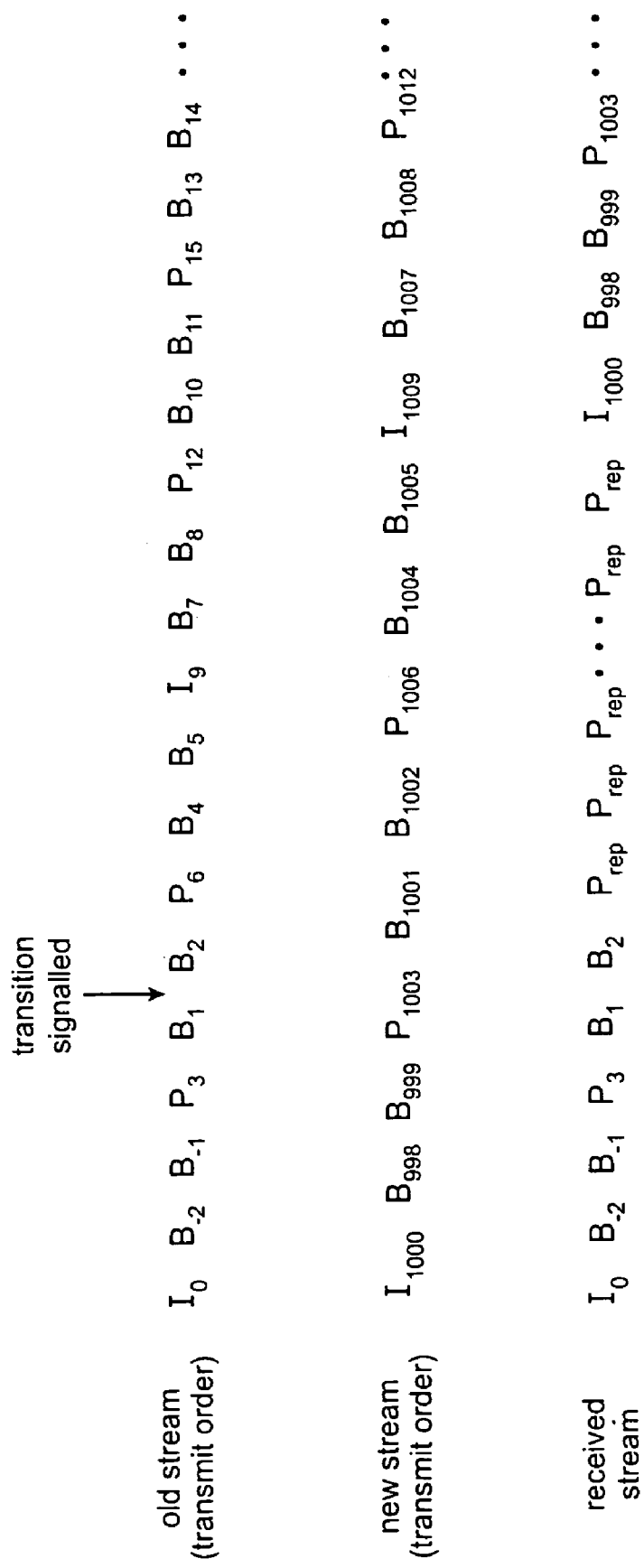
FIG. 12 is a schematic diagram illustrating a transition in transmission from old video stream to new video stream in accordance with the third technique of the present invention.

FIG. 12 is a schematic diagram illustrating a transition in transmission from old video stream to new video stream in accordance with the third technique of the present invention. The top line represents, in transmit order, the picture frames in a section of the old stream in the vicinity of the transition. The middle line represents, also in transmit order, the picture frames of the new stream. Transmit order correlates with decode order, rather than presentation order. The bottom line represents the stream received by a subscriber station 112.

Using MPEG terminology, the intra-coded (I-picture), predicted (P-picture), and bidirectionally predicted (B-picture) frames are represented by I, P, and B, respectively. The subscripts indicate the presentation (display) order for the frames. I and P frames may be called "reference" or "anchor" pictures. Reference pictures must be received before predicted pictures for proper decoding and reconstruction of a video sequence.

In the example shown in FIG. 12, a transition is signaled between frames $B_1$ and $B_2$ in the old stream. Sometime after the transition is signaled, the server 104 transitions from serving the old stream to serving the new stream. In accordance with the third technique of the present invention, a substitution device only allows the transmission of packets of the old stream carrying up to frame $B_2$. Subsequently, the substitution device replaces packets of the old stream with "picture repeat" packets, denoted by $P_{rep}$. This continues until packets of the new stream come through. The substitution device allows the transmission, without substitution, of packets of the new stream. The result is the received stream shown in FIG. 12. At the subscriber station 112, receipt of the picture repeat packets effectively causes a repeat of the P3 frame (the last frame in display order of the old stream).

Figure 13:
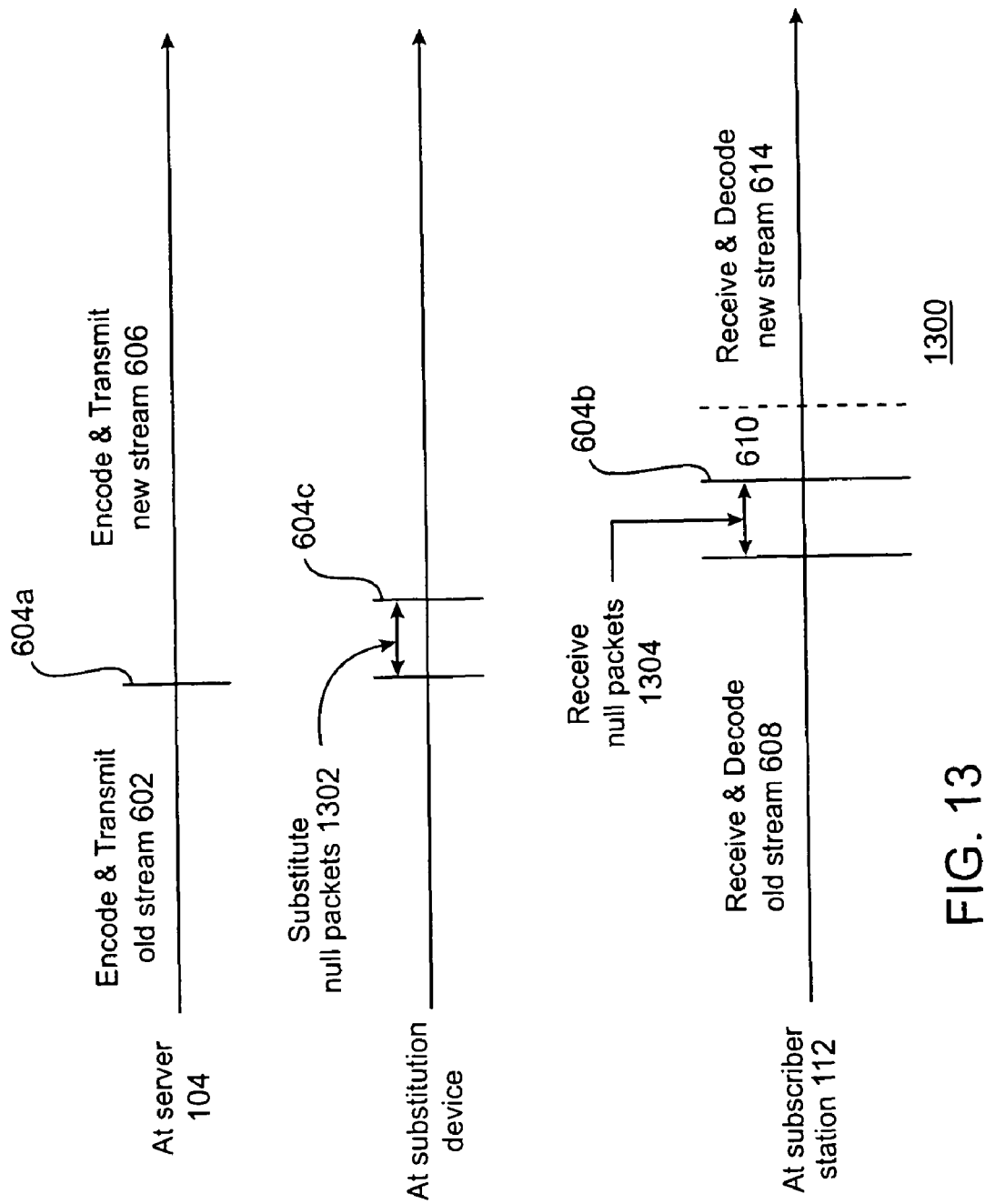
FIG. 13 is a timeline diagram illustrating a method for transitioning between digital video streams with a same PID in accordance with a fourth technique of the present invention.

FIG. 13 is a timeline diagram illustrating a method for transitioning between digital video streams with a same PID in accordance with a fourth technique of the present invention. By using the method 1300 of FIG. 13, such transitions may be made while avoiding the unstable period 609 prior to the transition 604b in FIG. 6. Thus, the fourth technique may be used to achieve results similar to those achieved by the third technique described above.

The first (top) timeline in the diagram represents events at the server (encoder) 104. In a first period 602 which is prior to the transition, the server 104 encodes and transmits an old video data stream. The first period 602 ends when the transition 604a from the old video stream to a transition point in a new video stream occurs. Subsequently, in a second period 606, data from the new video stream is encoded and transmitted.

The second (middle) timeline of the diagram represents events at a substitution device. In a preferred embodiment, the substitution device is located at a MUX 106. As shown in FIG. 1, the MUX 106 may be located, for example, at a headend 102 or a remote hub 106 within a distribution system. Alternatively, the substitution device may be part of a video server 104. For a time period 1302 before the transition 604c, the substitution device replaces packets in the old stream with null packets. As described above in relation to FIG. 8, a null packet comprises a transport packet 200 with a designated PID 208 which identifies the packet as a null packet. In a preferred embodiment, a payload 204 of a null packet includes sufficient "transitions" between 0 and 1 for phase lock to be achieved by the receiving hardware. The null packets may be substituted or repeatedly inserted until the start of the new stream at the transition 604c.

The third (bottom) timeline of the diagram represents events at the subscriber station (set-top) 112. In a first period 608, the subscriber station 112 is able to receive and decode the old video data stream. As the first period ends 608, a second period 1304 occurs during which the null packets are received. During this second period 1304, the subscriber station 112 usually repeats the last picture of the first period 608. Hence, a still image is usually displayed. As discussed further below in relation to FIG. 14, this last picture is preferably a "reference picture."

In a preferred embodiment, sufficient null packets are received to cause the entire decoder buffer to be drained. This causes an underflow of the decoder buffer. Subsequently, the buffer refills with the new video stream. This draining of the decoder buffer advantageously results in reduced display artifacts in the vicinity of the transition 604b.

After the transition 604b, a third period 610 and a fourth period 614 may follow, as described above in relation to FIG. 6. During the third period 610, data from the new video stream is being received, but the timing information is not yet properly synchronized between the new stream and the subscriber station 112. The third period 610 ends when the subscriber station 112 finally resets 612 its clock so as to be properly synchronized with the timing information in the new stream. Once the clock is reset 612, the subscriber station 112 enters the fourth period 614 where it is able to receive and decode the new stream.

Figure 14:
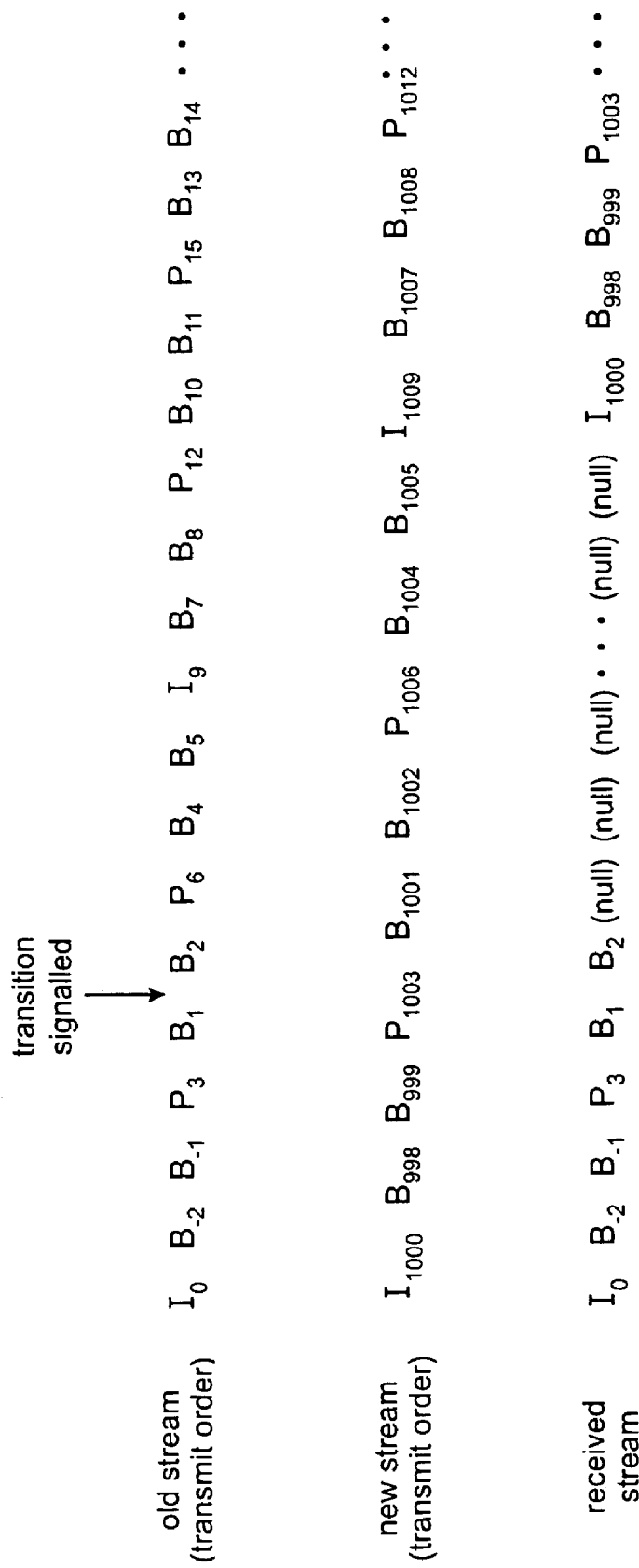
FIG. 14 is a schematic diagram illustrating a transition in transmission from old video stream to new video stream in accordance with the fourth technique of the present invention.

FIG. 14 is a schematic diagram illustrating a transition in transmission from old video stream to new video stream in accordance with the fourth technique of the present invention.

FIG. 14 is similar to FIG. 12, except that null packets (null) are substituted by the substitution device instead of "picture repeat" packets.

In the example shown in FIG. 14, a transition is signaled between frames $B_1$ and $B_2$ in the. old stream. Some period of time after the transition is signaled, the server 104 transitions from serving the old stream to serving the new stream. In accordance with the fourth technique of the present invention, a substitution device only allows the transmission of packets of the old stream carrying up to frame $B_2$. Subsequently, the substitution device replaces packets of the old stream with null packets, denoted by (null). This continues until packets of the new stream come through. The substitution device allows the transmission, without substitution, of packets of the new stream. The result is the received stream shown in FIG. 14. At the subscriber station 112, receipt of the null packets usually causes a still image of the $P_3$ frame to be displayed.

The various techniques discussed above may be combined to further improve the smoothness and quickness of the video stream transitions. For example, the first technique may be combined with either the third or fourth technique to eliminate both the unstable period 609 before the transition 604b and the unsynchronized delay 610 after the transition 604b. Similarly, the second technique may be combined with either the third or fourth technique to eliminate both the unstable period 609 before the transition 604b and the unsynchronized delay 610 after the transition 604b. It is also possible to combine: (i) the first and second techniques; (ii) the first, second, and third techniques; and (iii) the first, second and fourth techniques.

The above description is intended to illustrate the operation of preferred embodiments of the present invention and is not meant to limit the scope of the invention. From the above discussion, variations will be apparent to one skilled in the art that would yet be encompassed by the spirit and scope of the invention.

What is claimed is:

1. A method for transitioning between digital video streams, the method comprising:
    serving a first video stream with a packet identifier (PID) value;
    determining shifts needed to be applied to timing information in a second video stream in order to generate recalculated timing information; wherein the shifts are determined based on a last received clock reference;
    replacing the timing information in the second video stream with the recalculated timing information;
    transitioning in an immediate and smooth manner to the second video stream having the same PID value; and
    serving the second video stream.

2. The method of claim 1, wherein transitioning in an immediate and smooth manner comprises transitioning without an unsynchronized delay at a beginning of the second video stream.

3. The method of claim 1, wherein transitioning in an immediate and smooth manner comprises transitioning without an unstable period at an end of the first video stream.

4. The method of claim 1, wherein transitioning in an immediate and smooth manner comprises transitioning without an unsynchronized delay at a beginning of the second video stream and without an unstable period at an end of the first video stream.

5. A method for transitioning between digital video streams, the method comprising:
    transmitting a first video stream;
    wherein the first video stream has associated with it a plurality of transition points comprising respective beginnings of a stripe section of a storage drive in a storage array;
    transitioning from the first video stream to a second video stream;
    determining shifts needed to be applied to timing information in the second video stream in order to generate recalculated timing information; wherein the shifts are determined based on a last received clock reference;
    replacing the timing information in the second video stream with the recalculated timing information; and
    transmitting the second video stream.

6. The method of claim 5, wherein the timing information includes decode and presentation time stamps.

7. The method of claim 5, wherein the timing information includes clock reference values.

8. The method of claim 5, where the method is performed at a distribution headend.

9. The method of claim 5, where the method is performed at a remote hub of a distribution system.

10. The method of claim 5, wherein the shifts applied to timing information are adapted to a lag between the time of a transition at a server and the time of the transition at a subscriber station.

11. The method of claim 5, wherein the shifts comprise differences between a program clock reference of the first video stream and a program clock reference of the second video stream.

12. The method of claim 5, wherein a first packet including recalculated timing information is associated with a discontinuity indicator.

13. The method of claim 12, wherein the discontinuity indicator is adapted to cause a clock reset at a subscriber station.

14. The method of claim 5, wherein each transition point is identified via a discontinuity indicator.

15. The method of claim 14, wherein the transition points are associated with respective reference frames.

16. The method of claim 14, wherein the transition points are associated with respective reference frames.

17. The method of claim 14, wherein the transition points are associated with respective NULL packets.

18. The method of claim 5, further comprising:
    receiving a signal to transition from the first video stream to the second video stream; and
    removing packets of the first video stream, and transmitting picture repeat packets in substitute therefore.

19. The method of claim 18, where the picture repeat packets comprise zero motion vectors.

20. The method of claim 18, further comprising:
    after receiving the signal to transition, and before removing packets, transmitting packets of the first video stream until a first packet comprising a reference picture.

21. The method of claim 5, further comprising:
    receiving a signal to transition from the first video stream to the second video stream; and
    removing packets of the first video stream, and inserting NULL packets in substitute therefore.

* * * * *